United States Patent [19]

Lees

[11] Patent Number: 4,784,300

[45] Date of Patent: Nov. 15, 1988

[54] LIQUID METERING DEVICE WITH TIME DELAYED CLOSURE

[75] Inventor: Colin Lees, Stafford, United Kingdom

[73] Assignee: Hanwin Supplies Limited, Cannock, England

[21] Appl. No.: 109,177

[22] Filed: Oct. 16, 1987

[30] Foreign Application Priority Data

Oct. 17, 1986 [GB] United Kingdom ............... 8624940

[51] Int. Cl.$^4$ ............................................. G01F 11/32
[52] U.S. Cl. ..................................... 222/453; 222/36; 222/477
[58] Field of Search ............... 222/425, 442, 448, 450, 222/451, 453, 477, 499, 476, 36, 38

[56] References Cited

U.S. PATENT DOCUMENTS 3,460,723  8/1969  Young ........................... 222/442 X
3,731,856  5/1973  Young ............................... 222/477

FOREIGN PATENT DOCUMENTS 1192383  5/1970  United Kingdom .
2072625 10/1981  United Kingdom .
2147879  5/1985  United Kingdom .
2152477  8/1985  United Kingdom .

Primary Examiner—Kevin P. Shaver
Attorney, Agent, or Firm—Cushman, Darby & Cushman

[57] ABSTRACT

A device for dispensing a predetermined, measured quantity of liquid from an inverted bottle incorporates a delay mechanism whereby a plunger within the measuring chamber is held in an open condition for a predetermined period of time sufficient to ensure delivery of the entire contents of the measuring chamber. The delay mechanism is associated with a linkage system whereby an operating member disposed adjacent to the outlet of the measuring chamber is coupled to the plunger and comprises a piston which is driven in a cylinder by a spring at a rate determined by the rate at which a fluid flows through a restricting orifice.

6 Claims, 2 Drawing Sheets

LIQUID METERING DEVICE WITH TIME DELAYED CLOSURE

BACKGROUND OF THE INVENTION

Field of the Invention

This invention relates to an apparatus, of the kind usually known as an optic, for dispensing a predetermined, measured quantity of liquid from an inverted bottle. Such an apparatus comprises a measuring chamber with an inlet at one end which, in use, is connected to the mouth of the inverted bottle, and an outlet opening at the other end through which the measured quantity of liquid is dispensed. The measuring chamber incorporates a double-headed plunger which in a first position closes the outlet whilst leaving the inlet open so that the measuring chamber fills with liquid from the bottle, and in a second position the plunger closes the inlet and leaves the outlet open so that the measured quantity of liquid drains from the measuring chamber. Normally, the plunger is operated either by a bar which is engaged, and lifted, by a glass into which the liquid is dispensed, or by a lever which is also operated by the glass.

In conventional designs of such apparatus, it is possible for the user to dispense less than the full measured quantity of liquid, by removing the glass, and thereby allowing the plunger to return to its first position, before the measuring chamber is entirely empty, and it is one of the objects of the present invention to reduce or eliminate this possibility.

SUMMARY OF THE INVENTION

In accordance with the invention, apparatus of the kind described above for dispensing a measured quantity of liquid incorporates a delay mechanism whereby the plunger is held in its second position for a predetermined period of time sufficient to ensure delivery of the entire contents of the measuring chamber.

The delay mechanism is preferably associated with a linkage system whereby an operating member disposed adjacent to the outlet of the measuring chamber is coupled to the plunger. Spring means may be provided to return the plunger to its first position automatically at the expiration of the delay period afforded by the delay mechanism. The delay mechanism may comprise a piston which is driven in a cylinder by said spring means at a rate determined by the rate at which a fluid (for example air, water or oil) flows through a restricting orifice. The spring means or the piston, or a member associated therewith, may be arranged to engage part of the linkage system and thereby throw the latter in the direction required to move the plunger from its second position to its first position. The linkage system preferably incorporates an over-center mechanism whereby the plunger is moved between its two positions with a snap action.

Alternative forms of delay mechamism could be employed including spring-actuated mechanism which move a locking member, or electrically actuated mechanisms.

The delay mechanism and linkage mechanism are preferably enclosed in a housing, with the measuring chamber arranged outside of said housing. The housing may also include a counter which is operated by a member associated with the plunger. The counter may be a mechanical device which provides a display at the point of use, and/or an electrical device which provides an outlet for connection to a remote meter or stock-control computer or the like.

BRIEF DESCRIPTION OF THE DRAWINGS

These and other aspects of the invention will now be described by way of example with reference to one specific embodiment of the invention as illustrated in the accompanying drawings wherein.

DESCRIPTION OF THE PREFERRED EMBODIMENTS

Figure 1:
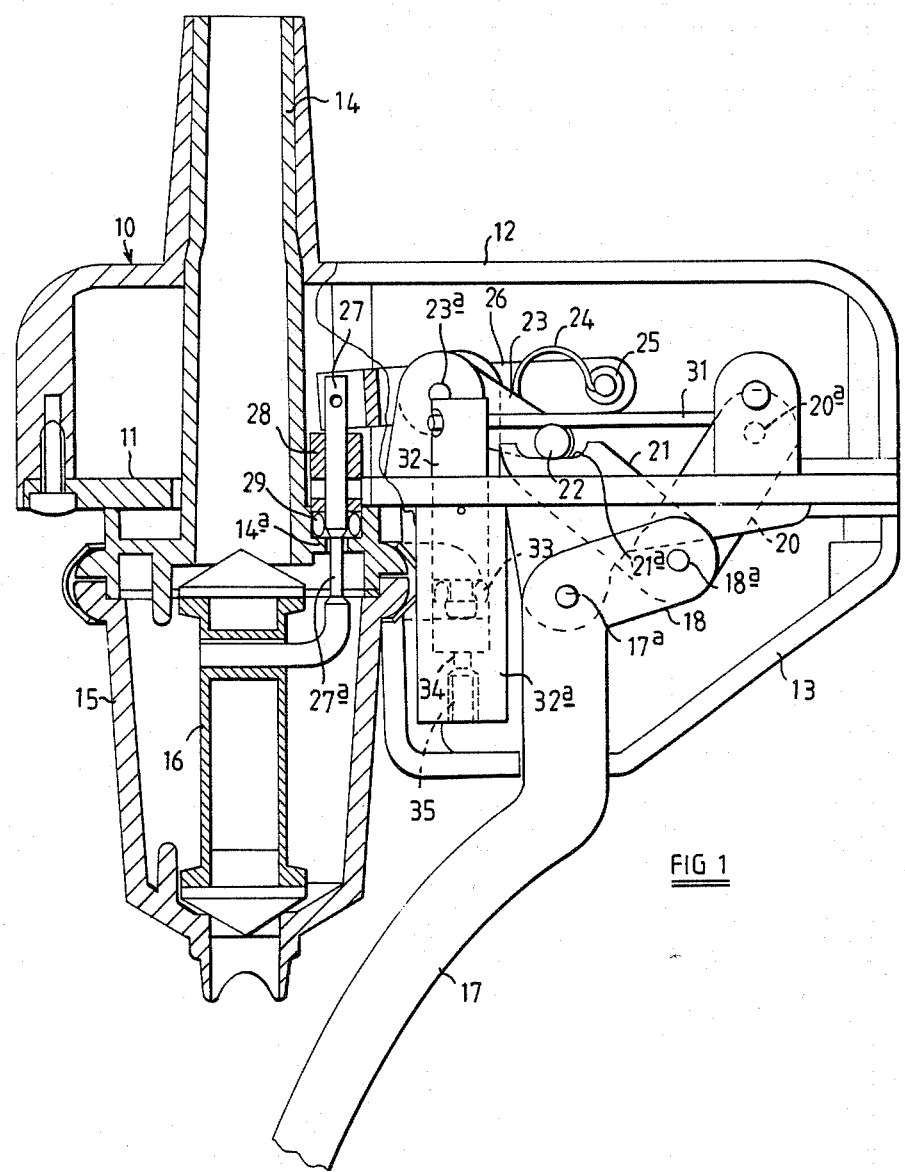
FIG. 1 shows a part sectional view of an apparatus in accordance with the invention.

As shown in the accompanying drawings the apparatus comprises a housing 10 comprising a base plate 11 carrying a top cover 12 and bottom cover 13. The housing supports a feeder tube 14 which is adapted to enter the mouth of an upturned bottle and provide sealing engagement therewith. A measuring chamber 15 is connected to the lower end of the feeder tube 14 and contains a vertically displaceable double-header plunger 16 which is movable, by a mechanism as hereinafter described, between a first position, as shown, in which the lower end of the plunger closes an outlet at the lower end of a measuring chamber, and a second, or raised, position in which the upper end of the plunger closes the lower end of an feeder tube which affords an inlet at the upper end of the measuring chamber.

Figure 2:
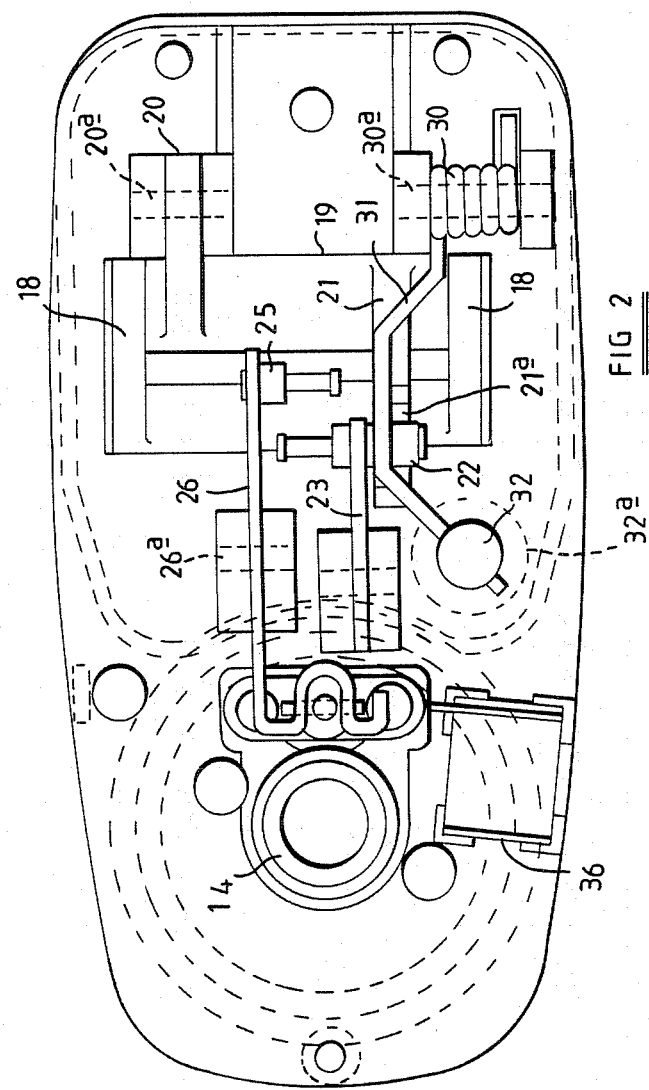
FIG. 2 shows a corresponding plan view of the apparatus with a top cover removed.

The mechanism for displacement of the plunger 16 comprises an operating lever 17 which is pivotally mounted on the base plate 11 at 17a, and is so shaped as to be displaced by the operators hand which holds the glass as it is presented to the outlet. The lever 17 is formed with a pair of spaced rearwardly extending arms 18 which carry between them a transversely extending pivot 18a which itself carries a rocker member 9 comprising a tubular body with a rearwardly directed arm 20 which is pivotally mounted on the base plate 11 and 20a, and a forwardly directed arm 21 formed with a recess 21a at its outer end. The recess 21a engages a transverse pin 22 carried by an arm 23 which is pivotally mounted on the base plate 11 at 23a. A C-shaped spring 24 (not shown in FIG. 2) couples pin 22 to a similar pin 25 carried by a rocking lever 26 which is pivotally mounted on the base plate 11 at 26a. At the opposite end from pin 25, the rocking lever 26 carries a lifting arm 27 which is coupled to the plunger 16 in the measuring chamber 15. The lifting arm 27 moves in a bushing 28 and through a seal 29. A reduced diameter portion 27a of the lifting arm extends through an aperture 14a in a flange which forms part of the feeder tube 14 and serves to define the upper end portion of the measuring chamber. The arrangement is such that when the plunger 16 is in its first position, as shown in FIG. 1, an air-tight seal is formed around the lifting arm 27 by the seal 29. Air in the empty measuring chamber can ascend through the feeder tube into the bottle whilst liquid from the bottle flows downwardly to fill the measuring chamber.

When the operating lever 17 is moved rearwardly by the presentation of a glass to the outlet of the measuring chamber 15, the rocker member 19 pivots in such a manner as to lift pin 22. The spring 24 is designed to afford an over-center mechanism whereby the pin 25 is thrown sharply downwardly, so as to raise the lifting arm 27 and thereby displace the plunger 16 into its raised position. In this position, the upper end of the plunger 16 seals the lower end of the feeder tube 14, and the reduced diameter portion 27a registers with the seal 29 so as to allow air to flow through the aperture 14a into the measuring chamber 15 to facilitate smooth and rapid discharge of the liquid from the measuring chamber through its outlet into the glass whereby the operating lever is displaced.

It is to be noted that the lever system described above is a particularly compact mechanism whereby the overall dimensions of the housing 10 can be minimised, and the external shape of the housing can be simple and easy to clean.

To return the plunger 16 to its first position when the operating lever 17 is released, a torsion spring 30 is carried on a pin 30a. One arm of the torsion spring reacts against the base plate 11, whilst the other arm 31 bears on the pin 22, so urging the latter downwardly. Thus, when the operating lever 17 is released, the plunger 16 would be lifted by actuation of the spring 24 in the reverse direction. However, in accordance with the invention the end of the arm 31 of the torsion spring 30 engages a damper rod 32 which is movable in a dash pot 32a and carries a seal 33 which is of inverted U-shape in section so as to allow effectively unrestricted movement of the rod 32 in the upward direction, by allowing air to flow around the seal. However, movement of the rod 32 downwardly under the action of the torsion spring 30 is resisted since the seal 33 becomes effective and air within the dash pot 32a can only escape through a throttling orifice 34 which is regulated by means of a bleed screw 35.

Thus, in operation, when the lever 17 is initially displaced rearwardly, the damper rod 32 is lifted at the rate determined by the operation of the C-spring 24. When the glass is removed from the outlet so as to release the lever 17, instead of the plunger 16 being immediately driven back to its first position to prevent further discharge of liquid from the measuring chamber 15, the dash pot 32a regulates the rate at which the damper rod 32 moves downwardly, and accordingly there is a predetermined time delay before the pin 22 reaches the position in which the C-spring 24 snaps from one state to the other to drive the plunger 16 downwardly.

Thus, if the glass is removed from the outlet of the measuring chamber before the chamber has emptied completely, the liquid will continue to flow from the chamber so that it will be obvious that short measure has been dispensed into the glass.

Whilst it is particularly convenient to employ an operating mechanism including a lever which is displaced by presentation of a glass to the outlet of the measuring chamber, it will be appreciated that other forms of actuating mechanism could be employed, for example a manually operated button which can be pressed once and released immediately, the delay mechanism ensuring that the plunger is held in its second position long enough for the contents of the measuring chamber to be discharged entirely.

The housing may also contain a counter 36 which may be operated by means of a suitable linkage from the lifting arm 27. Likewise, whilst a mechanical actuation system is preferred, it would alternatively be possible to employ an electrically actuated system for moving the plunger 16, with an electrically controlled time delay.

Moreover, whilst the time delay is a mechanical system is most conveniently pneumatic in operation, it would alternatively be possible to employ an hydraulic damper having similar characteristics.

I claim:

1. In apparatus for dispensing measured quantities of liquid comprising a measuring chamber with an inlet at one end which, in use, is connected to the mouth of an inverted bottle, and an outlet opening at the other end through which the measured quantity of liquid is dispensed, the measuring chamber incorporating a double-headed plunger which in a first position closes the outlet while leaving the inlet open so that the measuring chamber fills with liquid from the bottle, while in a second position the plunger closes the inlet and leaves the outlet open so that the measured quantity of liquid drains from the measuring chamber, and delay means for holding said plunger in said second position for a predetermined period of time sufficient to ensure delivery of the entire contents of the measuring chamber, the improvement comprising a linkage system, which has an operating member disposed adjacent to the outlet of the measuring chamber, said linkage system being coupled to said plunger and to said delay means, and a first spring means to return said plunger to its first position automatically at the expiration of the delay period afforded by the delay means, wherein the delay means comprises a piston and cylinder type assembly in which the piston is driven in the cylinder by a second spring means at a rate determined by the rate at which a fluid flows through a restricting orifice provided in said assembly.

2. Apparatus according to claim 1 wherein the linkage system incorporates an over-center mechanism whereby the plunger is moved between its two positions with a snap-action.

3. Apparatus according to claim 1 wherein a housing encloses the delay means and linkage system while the measuring chamber is disposed externally of said housing.

4. Apparatus according to claim 1 further comprising a counter and a counter operating member coupled with said plunger.

5. Apparatus according to claim 1 wherein said linkage system comprises a rocker member carried by said operating member, a pivoted lever carrying a first pin engaged by said rocker member, a further rocking lever which carries at one end a lifting arm coupled to the plunger and at the other end a second pin, and said first spring means which is C-shaped, coupling said first and second pins.

6. Apparatus according to claim 5 wherein said second spring means engages said first pin in opposition to said rocker member and said delay means is coupled to said second spring means.

* * * * *